(12) United States Patent
Lashina et al.

(10) Patent No.: US 9,824,125 B2
(45) Date of Patent: Nov. 21, 2017

(54) METHODS AND APPARATUS FOR STORING, SUGGESTING, AND/OR UTILIZING LIGHTING SETTINGS

(71) Applicant: PHILIPS LIGHTING HOLDING B.V., Eindhoven (NL)

(72) Inventors: Tatiana Aleksandrovna Lashina, Eindhoven (NL); Paul Anthony Shrubsole, Arnhem (NL); Dirk Valentinus Rene Engelen, Heusden-Zolder (BE); Dzmitry Viktorovich Aliakseyeu, Eindhoven (NL); Bartel Marinus Van De Sluis, Eindhoven (NL); Ramon Antoine Wiro Clout, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 303 days.

(21) Appl. No.: 14/406,770

(22) PCT Filed: Jun. 3, 2013

(86) PCT No.: PCT/IB2013/054564
§ 371 (c)(1),
(2) Date: Dec. 10, 2014

(87) PCT Pub. No.: WO2013/186665
PCT Pub. Date: Dec. 19, 2013

(65) Prior Publication Data
US 2015/0161137 A1    Jun. 11, 2015

Related U.S. Application Data

(60) Provisional application No. 61/658,030, filed on Jun. 11, 2012.

(51) Int. Cl.
G06F 17/30 (2006.01)
H05B 37/02 (2006.01)

(52) U.S. Cl.
CPC ....... G06F 17/3053 (2013.01); H05B 37/029 (2013.01); H05B 37/0245 (2013.01)

(58) Field of Classification Search
CPC ................................................. G06F 17/33053
(Continued)

(56) References Cited

U.S. PATENT DOCUMENTS 6,016,038 A    1/2000   Mueller et al.
6,211,626 B1   4/2001   Lys et al.
(Continued)

FOREIGN PATENT DOCUMENTS

EP    1826688 A3      1/2008
WO    2007119126 A2   10/2007
(Continued)

OTHER PUBLICATIONS

B. Mols, For sale: Mood Tuscany for your living room—Delft Outlook, 2004.
(Continued)

*Primary Examiner* — Baoquoc N To
(74) *Attorney, Agent, or Firm* — Meenakshy Chakravorty (57) ABSTRACT

Disclosed are methods and apparatus for storing, suggesting, and/or utilizing lighting settings. A database of relevant lighting settings for recommendation to lighting users may be managed and at least some of the relevant lighting settings may each be associated with a weighting corresponding to an experience level of a user that created the lighting setting. Relevant lighting settings for a lighting system may also be identified and a creator experience level, lighting systems contextual data, and/or reconstructability of
(Continued)

the lighting settings may be used in identifying and/or sorting the relevant lighting settings.

10 Claims, 4 Drawing Sheets

(58) Field of Classification Search
USPC .......................................... 707/748, 751, 753
See application file for complete search history.

(56) References Cited

U.S. PATENT DOCUMENTS

| | | | | |
|---|---|---|---|---|
| 8,190,486 | B1* | 5/2012 | Ouimet | G06Q 30/02 705/26.1 |
| 8,379,028 | B1* | 2/2013 | Mullins | G06T 13/40 345/419 |
| 2004/0252486 | A1 | 12/2004 | Krause | |
| 2006/0057545 | A1* | 3/2006 | Mozer | G09B 5/06 434/156 |
| 2008/0227384 | A1* | 9/2008 | Placzek | H04N 21/4113 455/3.06 |
| 2008/0250102 | A1* | 10/2008 | Anei | H04L 67/10 709/203 |
| 2008/0315772 | A1* | 12/2008 | Knibbe | G01S 13/825 315/149 |
| 2009/0063983 | A1* | 3/2009 | Amidon | G06Q 30/02 715/733 |
| 2010/0060473 | A1* | 3/2010 | Konno | G06F 1/1616 340/686.1 |
| 2011/0166710 | A1* | 7/2011 | Kordik | H02J 3/14 700/277 |
| 2012/0081030 | A1* | 4/2012 | Berkvens | H05B 37/0272 315/291 |
| 2012/0173382 | A1* | 7/2012 | Loveland | G06Q 30/0601 705/26.5 |
| 2013/0311143 | A1* | 11/2013 | Striegel | G06F 17/5009 703/1 |
| 2013/0322711 | A1* | 12/2013 | Schultz | G06F 19/3418 382/128 |

FOREIGN PATENT DOCUMENTS

| | | |
|---|---|---|
| WO | 2009087537 A2 | 7/2009 |
| WO | 2010079388 A1 | 7/2010 |
| WO | 2010150150 A1 | 12/2010 |
| WO | 2011033409 A1 | 3/2011 |

OTHER PUBLICATIONS

Tommaso Gritti, "ImagLight: a Vision to Lighting Scene Setting"; To be published in ACM Multimedia.

* cited by examiner

METHODS AND APPARATUS FOR STORING, SUGGESTING, AND/OR UTILIZING LIGHTING SETTINGS

CROSS-REFERENCE TO PRIOR APPLICATIONS

This application is the U.S. National Phase application under 35 U.S.C. §371 of International Application No. PCT/IB2013/054564, filed on Jun. 3, 2013, which claims the benefit of U.S. Provisional Patent Application No. 61/658,030, filed on Jun. 11, 2012. These applications are hereby incorporated by reference herein.

TECHNICAL FIELD

The present invention is directed generally to lighting settings that may be utilized to control one or more aspects of at least one lighting fixture. More particularly, various inventive methods and apparatus disclosed herein relate to storing, suggesting, and/or utilizing lighting settings.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Modern lighting fixtures, such as LED-based lighting fixtures, can provide multiple lighting effects possibilities. For example, LED-based lighting fixtures may offer end users the possibility of adjusting one or more lighting stings, such as brightness, color temperature, light color, light spot direction, light patterns, light dynamics, etc. These multiple lighting settings possibilities provide users a wide range of flexibility and a pallet of possible lighting options when configuring a single lighting fixture or a lighting system having a plurality of lighting fixtures. However, the multiple lighting settings possibilities may also make determination of lighting settings complex for inexperienced users. Some lighting systems may be provided with one or more default settings to enable a user to select among the default settings and simplify operation of the lighting system. However, such default settings may have one or more drawbacks such as not being universally applicable to all locations, not being universally applicable to all situations, and/or only presenting a limited set of suggested lighting effects for utilization by a user.

Thus, there is a need in the art to assist users of lighting systems in determining lighting settings by storing, suggesting, and/or utilizing one or more lighting settings created by other lighting system users.

SUMMARY

The present disclosure is directed to inventive methods and apparatus for storing, suggesting, and/or utilizing lighting settings. For example, in some embodiments a database of relevant lighting settings for recommendation to lighting users may be managed and at least some of the relevant lighting settings may each be associated with a weighting corresponding to an experience level of a user that created the lighting setting. Also, for example, in some embodiments, relevant lighting settings for a lighting system may also be identified and a setting creator experience level, lighting systems contextual data, and/or reconstructability of the lighting settings may be used in identifying and/or sorting the relevant lighting settings.

Generally, in one aspect, a method of managing a database of relevant lighting settings for recommendation to lighting users, is provided and includes: receiving changed lighting settings data and corresponding identification data; the changed lighting settings data indicative of changes to lighting characteristics of at least one lighting fixture and the identification data indicative of a user of the lighting fixture; determining a weighting corresponding to an experience level of the user; and associating the weighting with the changed lighting settings data in the database.

In some embodiments, the experience level is based on at least one of an amount of time and a number of times the user has engaged in changes to the lighting characteristics of the lighting fixture.

In some embodiments, the experience level is identified based on the identification data, e.g. the identification data may include the experience level.

In some embodiments, the experience level is based on demographic data associated with the user. In some versions of those embodiments, the experience level is based on a registration date of the user.

In some embodiments, the method further includes associating lighting contextual data with the changed lighting settings data. In some versions of those embodiments the lighting contextual data includes at least one of user defined context, geographical location, lighting fixture type, lighting fixture arrangement, date, time, ambient light level, room type, room properties, lighting system properties, and activity. The lighting contextual data may optionally include geographical location and user defined context.

Generally, in another aspect, a method of identifying relevant lighting settings for a lighting system is provided and includes: receiving identification data and lighting system contextual data; the identification data indicative of a user of a lighting system and the lighting system contextual data indicative of at least one contextual parameter of the lighting system; calculating a relevancy ranking for each lighting setting of a group of lighting settings by comparing at least some of the lighting system contextual data to stored contextual data associated with each lighting setting; sorting the group of lighting settings based on the relevancy ranking of the lighting settings; and utilizing a setting creator experience level of the lighting settings in at least one of the step of sorting the group of lighting settings and identifying the group of lighting settings from a larger group of lighting settings.

In some embodiments, the method further includes the step of calculating a reconstructability ranking for each the lighting setting of the group of lighting settings. In some versions of those embodiments the step of calculating the reconstructability ranking includes comparing lighting system architectural data of the lighting system with architectural data associated with each of the lighting settings. In some versions of those embodiments the step of sorting the group of lighting settings is also based on the reconstructability ranking. In some versions of those embodiments, identification of the group of lighting settings is also based on the reconstructability ranking. In some versions of those embodiments, the method may further include providing the reconstructability ranking to the user.

In some embodiments, comparing of the contextual data includes lighting infrastructure data indicative of an infrastructure of the lighting system.

In some embodiments, comparing of the contextual data includes geographical location information.

In some embodiments, the step of sorting the group of lighting settings is based on the setting creator experience level.

The identification data could be anonymous and not traceable to a particular individual.

Generally, in another aspect, a method of automatically receiving actual lighting settings from a first user and providing the actual lighting settings as recommended lighting settings to a second user is provided and includes: automatically receiving first lighting settings and corresponding first lighting contextual data, the first lighting settings indicative of lighting characteristics of a first lighting system of a first user of the first lighting system, the first lighting contextual data indicative of at least one first contextual parameter of the first lighting system; determining an experience level of the first user; associating the experience level with the lighting settings; receiving second lighting contextual data from a second user of a second lighting system, the second lighting contextual data indicative of at least one second contextual parameter of the second lighting system; receiving a suggested lighting settings request from the second user; and calculating ranking of the first lighting settings for the suggested lighting settings request by comparing the second contextual parameter to the first contextual parameter and by analyzing the experience level of the first user.

Other embodiments may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various embodiments, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some embodiments, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various embodiments of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various embodiments of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Modern lighting fixtures, such as LED-based lighting fixtures, can provide multiple lighting settings. These multiple lighting settings provide users a wide range of flexibility and a pallet of possible lighting options when configuring lighting fixtures. However, the multiple lighting settings may also make determination of lighting settings complex for inexperienced users. Some lighting systems may be provided with one or more default settings to enable a user to select among the default settings and simplify operation of the lighting system. However, such default settings may have one or more drawbacks. Thus, Applicants have recognized and appreciated a need to assist users of lighting systems in determining lighting settings by storing, suggesting, and/or utilizing one or more lighting settings created by other lighting system users.

More generally, Applicants have recognized and appreciated that it would be beneficial to provide methods and apparatus for storing, suggesting, and/or utilizing lighting settings.

In view of the foregoing, various embodiments and embodiments of the present invention are directed to lighting settings that may be utilized to control one or more aspects of at least one lighting fixture.

Lighting fixtures, such as those employing LEDs, may enable control over multiple lighting settings of the lighting fixture. For example, a local and/or segment lighting controller may direct control of the intensity level, color temperature, size, shape, direction, pattern, dynamics, and/or color of generated light of a lighting fixture. Some embodiments of methods and apparatus described herein may enable communication of one or more lighting settings from a controller controlling one or more lighting fixtures to a database for storage of the lighting settings. Some embodiments of methods and apparatus described herein may enable communication of one or more recommended lighting settings from a database to a controller controlling one or more lighting fixtures for implementation of the recommended lighting settings by the controller. Some embodiments of methods and apparatus may enable communication of implemented lighting settings to a database and/or communication of recommended lighting settings from a database. One of ordinary skill in the art, having had the benefit of the present disclosure, will recognize and appreciate that additional and/or alternative lighting settings for one or more lighting fixtures may be received, sent, and/or implemented according to one or more methods and/or apparatus described herein.

Figure 1:
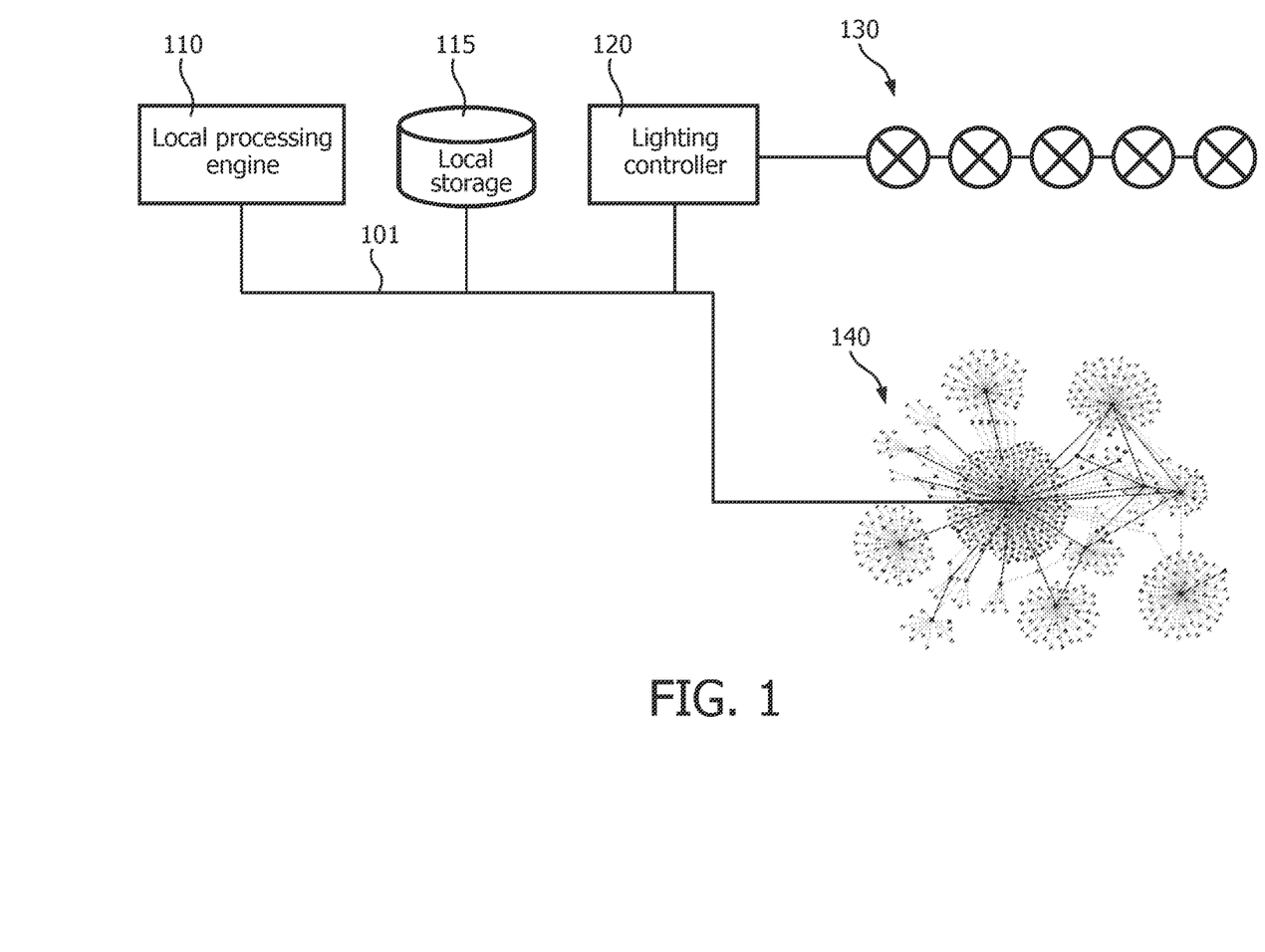
FIG. 1 illustrates an example environment that can be used to enable storing, suggesting, and/or utilizing one or more lighting settings.

Referring to FIG. 1, an example environment that can be used to enable storing, suggesting, and/or utilizing one or more lighting settings is illustrated. Lighting settings may include parameters set to control light output generated by a lighting fixture (e.g., color, shape, brightness, direction, patterns, dynamics) and may also include parameters set to control behaviors of the lighting fixture (e.g., automatically shutting off at certain times of day, automatically dimming at certain times of day or in response to certain events or inputs, and/or automatically switching off the light when occupants leave). The example environment of FIG. 1 includes a communication network 101 that facilitates communication between various components of the environment. In some embodiments the communication network 101 may include the Internet, one or more intranets, and/or one or more bus subsystems.

The communication network 101 may optionally utilize one or more communications mediums, communications technologies, protocols, and/or inter-process communication techniques. For example, the communication mediums may include any physical medium, including, for example, twisted pair coaxial cables, fiber optics, and/or a wireless link using, for example, infrared, microwave, or encoded visible light transmissions and any suitable transmitters, receivers or transceivers to effectuate communication in the lighting fixture network. Also, for example, the communications technologies may include any suitable protocol for data transmission, including, for example, TCP/IP, variations of Ethernet, Universal Serial Bus, Bluetooth, FireWire, Zigbee, DMX, Dali, 802.11b, 802.11a, 802.11g, token ring, a token bus, serial bus, power line networking over mains or low voltage power lines, and/or any other suitable wireless or wired protocol.

In FIG. 1 a distributed network is provided having a plurality of lighting nodes in communication with one another. Each of the lighting nodes includes at least one lighting fixture and at least one lighting controller that controls the lighting fixture. The lighting nodes may optionally be installed in a particular location such as installed in a particular household, a patient room, a hotel room, an open-space office, etc. The controller of each lighting node is in direct or indirect communication with other lighting nodes of the distributed network and may be controlled locally by a user. A plurality of such lighting nodes 140 are illustrated in FIG. 1. The lighting nodes 140 are in communication with one another and with a local lighting node via communication network 101. The local lighting node is illustrated in additional detail in FIG. 1 and includes a lighting controller 120 in communication with and controlling a plurality of lighting fixture 130. The lighting controller 120 is in communication with local storage 115 and local processing engine 110. In some embodiments the local storage 115 and/or the local processing engine 110 may be part of the lighting node. In some embodiments the local processing engine 110 and/or the local storage 115 may be part of a computing device such as a personal computer and/or a tablet computer. The computing device may include memory for storage of data and software applications, a processor for accessing data and executing applications, and components that facilitate communication over the communication network 101. The computing device may execute one or more applications that enable the user to communicate with the lighting controller 120.

In some embodiments, the communication network 101 may include RF connectivity between neighboring lighting nodes. For example, RF-based communications between neighboring lighting nodes may be utilized to enable communication between lighting nodes in closely located houses, flats, etc. Accordingly, users who have a very similar layout of their living quarters and similar local conditions may make use of each other's lighting settings as described herein. Within such close communities, users may have very similar natural lighting conditions, similar locations and/or configurations of the dining rooms, bedrooms, etc. and, as a result, the relevance of the lighting settings may be relatively high between neighbors. Individual users may benefit from their neighbors who might have more experience with the system and/or who might be more active users and put more effort in experimenting with the system.

One or more user interfaces may be in communication with the lighting controller 120 to enable adjustment of lighting settings of the lighting fixtures 130. For example, a user interface of a computing device in communication with the lighting controller 120 may be utilized. For instance, in some embodiments a user interface of a mobile phone and/or a tablet computer may be utilized to communicate with the lighting controller 120 and alter one or more lighting settings. When the user makes a direct adjustment to the lighting settings via the lighting controller 120, the parameters of the changed lighting setting may be stored locally at the local storage 115 and/or sent out and stored in another database (e.g., other local storage of the network of lighting nodes and/or other storage accessible via communications network 101). When the user initiates an adjustment to the lighting setting from a stored lighting setting via the lighting controller 120, the stored lighting setting may be retrieved from the local storage 115 and/or another database (e.g., other local storage of the network of lighting nodes and/or other storage accessible via communications network 101) for implementation.

In some embodiments, the changed lighting setting initiated by direct adjustments by a user may be stored in combination with associated lighting contextual parameters. Lighting contextual parameters are additional parameters that provide additional context regarding the type of lighting fixtures and/or lighting controller present in the lighting node and/or the environment in which the lighting node is present. For example, lighting contextual parameters may include lighting fixture type, geographical location of the lighting fixtures, time of the year, time of the day, activity, user defined contexts, etc. User defined contexts may include one or more descriptors defined by a user that describe the situation or activity for which the lighting setting is intended. For instance, user defined context descriptors could include a dining area, a patient room, a hotel lobby, a sports shop, a retail environment, etc. In some embodiments where user defined contexts are utilized, a user may define the contexts during configuration of the lighting controller 120, during creation of a new lighting setting, and/or at will. As described herein, in some embodiments that utilize lighting contextual parameters, the lighting contextual parameters may be utilized to identify lighting settings that may be pertinent to another user (e.g., based on geographical preferences, seasonal preferences, time preferences, etc.).

In some embodiments, one or more sensors might be utilized to determine one or more of the lighting contextual parameters. For example, one or more sensors could be in communication with the local processing engine 110 and/or the lighting controller 120 to provide data thereto that is indicative of one or more environmental conditions. Sensors could include, for example, GPS sensors (to determine geographical location), lighting level sensors (to determine ambient light levels and/or lighting fixture light output levels), temperature sensors (to determine ambient temperature and/or lighting fixture temperature), and/or vision-based smart sensors utilized to extract presence, location, activity, etc. In some embodiments the lighting node may have connectivity to the Internet and the geographical location may be determined based on the IP address of the lighting node and detection of the geographical position via the IP address.

The local processing engine 110 may optionally receive user changed lighting settings from the lighting controller 120, optionally in combination with other data, and associate and/or send such changed lighting settings for storage at local storage 115 or other database utilizing techniques as described herein. The local processing engine 110 may additionally or alternatively optionally receive stored lighting settings from local storage 115 or other database (e.g., local storage of another lighting node), calculate a relevancy ranking for the stored lighting settings, and determine whether to use the stored lighting settings and/or display the stored lighting settings to a user for potential use with the lighting controller 120.

In some embodiments, the local processing engine 110 may perform one or more of the steps of the methods described herein such as, for example, those methods described with reference to FIGS. 4-6. The local processing engine 110 may be implemented in hardware, firmware, and/or software running on hardware. For example, the local processing engine 110 may be implemented in one or more computing devices.

In some embodiments, a user may utilize a user interface to request the most relevant settings for one or more lighting fixtures in a certain location (e.g., dining area, living room, lobby, patient room). In response to the user request, the local processing engine 110 may receive a plurality of stored lighting settings from local storage 115 or other database, calculate relevancy rankings for the stored lighting settings, and determine top ranked relevancy rankings. Each of the received stored lighting settings may include one or more pertinent parameters for calculating the relevancy rankings. The relevancy ranking of a lighting setting may be determined based on one or more of popularity of that lighting setting, similarity of that lighting setting to user preferences of the requester lighting node, similarity of the lighting fixture type(s) of that lighting setting to the actual lighting fixture type(s) of the requester lighting node, similarity of geographical location of that lighting setting to the geographical location of the actual lighting fixtures of the requester lighting node, etc.

In some embodiments, the weighting of one or more factors utilized to calculate the relevancy ranking may be application dependent and/or adjusted by the user. For example, the weighting given to geographical location may depend on the application and/or be adjusted by the user. For instance, in some embodiments stored lighting settings from neighbors might be given more value for light intensity adaptation by the user and/or application since light intensity may depend on local natural lighting level, regional preferences, house layout, etc. Also, for instance, in some embodiments the user and/or application might give more weight to remote users with respect to colored lighting or dynamic settings to benefit from remotely located experts.

In some embodiments, the relevancy ranking may be calculated as a cosine similarity between contextual data of the requesting lighting node and contextual data associated with stored lighting settings. The cosine similarity may be determined in a vector space where the space dimensions may include one or more pertinent lighting contextual parameters such as, for example, user preferences, lighting fixture type, geographical location, etc. In some embodiments the group of stored lighting settings for which relevancy rankings are determined may initially be filtered to only include certain stored lighting settings. For example, in some embodiments relevancy rankings may only be determined for a group of stored lighting settings that relate to the same contextual descriptor (e.g., only hotel lobbies, only living rooms, only bathrooms) and/or include at least one of the same lighting fixture types (e.g., spot lights, dining table lighting fixture). Also, for example, in some embodiments a reconstructability ranking of the stored lighting settings may be determined as described herein and relevancy rankings only determined for those stored lighting settings having a reconstructability ranking above a threshold ranking. The resulting group of stored lighting settings could then be sorted based on one or more factors such as, for example, the relevancy rankings of the lighting settings, the popularities of the lighting settings, and/or the experience levels of the users that created the lighting settings.

One or more of the sorted stored lighting settings may then be provided to the user for the user to choose which, if any, stored lighting settings to implement. For example, the top five stored lighting settings could be visualized by the user via implementation through lighting controller 120 to enable the user to determine which of the top five stored lighting settings is preferred. Also, for example, information concerning the top ranked stored lighting settings may be provided on a display of a computing device in communication with the lighting controller 120 and the user may choose one for implementation using a user interface.

In some embodiments, a user could utilize an actuator interface (e.g., a 'suggest' button on a touchscreen) that activates one of the top ranked stored user lighting settings via the lighting controller 120 and the lighting fixtures 130 upon each actuation. By engaging the actuator interface multiple times, a user may effectively 'browse' different lighting settings which are immediately activated via the lighting controller 120 and the lighting fixtures 130 for viewing by the user. Optionally, in some embodiments a 'back' button may be added to enable a user to move both forward and backward while browsing the different lighting settings. Also, optionally, in some embodiments a 'like' button may be provided and, when actuated, may trigger the system to rank lighting settings higher of the 'source user/creator' of the currently actuated stored user lighting settings.

Also, a user may have the option to automatically implement stored lighting settings via the lighting controller 120 and the lighting fixtures 130. For example, stored lighting settings that suit a changed context (e.g., from night to day, from summer to fall) may be provided, or simply new stored user lighting settings may be occasionally implemented (e.g., at random, on set intervals, when new better matching stored user lighting settings become available). In addition, a user may optionally subscribe to stored lighting settings created by particular users in the network. The users could be a friend, a most followed person, and/or a famous lighting designer. In some embodiments the user's lighting settings may automatically be updated every time the followed user creates a new lighting setting. In some embodiments the user may be presented with a new stored lighting setting of the followed user for potential implementation after the followed user creates the new stored lighting setting.

In some embodiments, a user may be provided with a predetermined number of the top relevant stored lighting settings for a specific user defined context descriptor. This may be accomplished via the selection of one of a plurality of default presets where the context descriptor has been specified already (e.g., the user selects a default "bathroom" setting). A user may be presented with a user interface with a 'top results' option and by clicking this option a query is sent together with relevant data to automatically retrieve the top lighting setting results for the given user.

In some embodiments, specific lighting settings may be given constraints to prevent modification of those lighting settings beyond a specified range. For example, lighting settings of one or more lighting fixtures in a hospital may be adjusted by a medical specialist in a manner related to the patient circadian rhythm regulation and those lighting settings may overrule any local changes attempted by a patient.

In some embodiments, at the beginning of launching methods and apparatus described herein, the stored lighting settings database may not be populated at all or to a sufficient degree. During such time, default lighting settings created by expert lighting designers may optionally be utilized as stored lighting settings. As soon as actual users start making any modifications to the default settings or create their own settings, such changed settings may be recorded in one or more stored lighting settings database.

Many other configurations are possible having more or less components than the environment shown in FIG. 1. For example, although the local processing engine 110, the local storage 115, and the lighting controller 120 are illustrated in FIG. 1 as separate components, it is understood that in some environments the local processing engine 110, the local storage 115, and/or the lighting controller 120 may optionally be partially or wholly integrated into a device.

Figure 2:
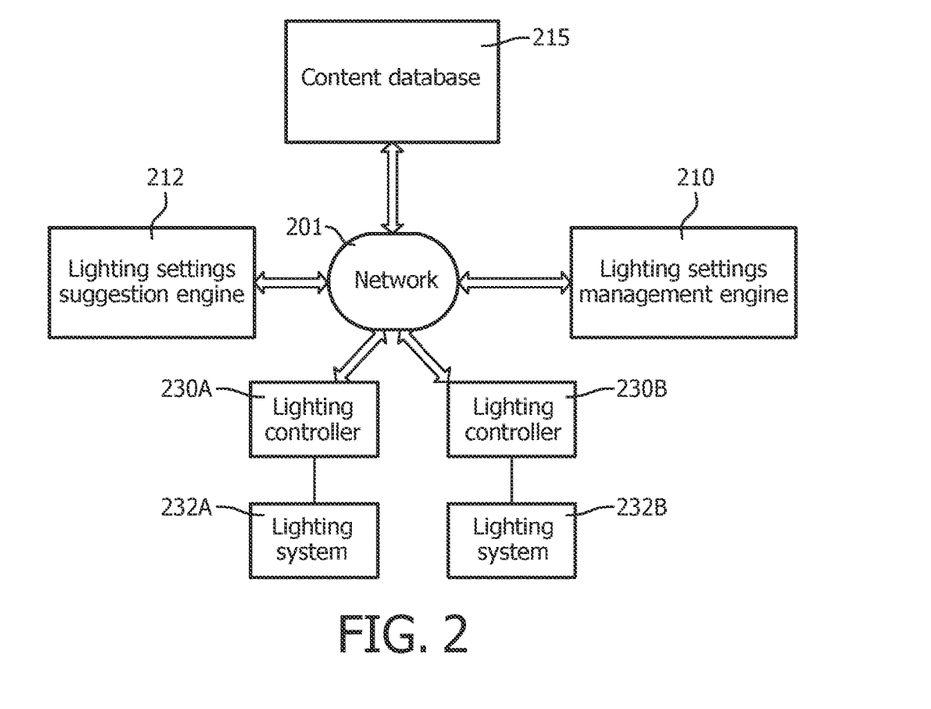
FIG. 2 illustrates another example environment that can be used to enable storing, suggesting, and/or utilizing one or more lighting settings.

FIG. 2 illustrates another example environment that can be used to enable storing, suggesting, and/or utilizing one or more lighting settings. The environment includes a communication network 201 that facilitates communication between the various components in the environment. The environment includes a lighting setting management engine 210, a lighting setting suggestion engine 212, a content database 215, lighting controllers 230A, 230B, and lighting systems 232A, 232B. Lighting systems 232A, 232B include a plurality of lighting fixtures and are controlled by respective lighting controllers 230A, 230B. Additional lighting controllers and/or lighting systems may be provided in other embodiments.

In some embodiments, a user may utilize a user interface and interact with one of the lighting controllers 230A, 230B to manually adjust the lighting settings of the lighting system 232A and/or to request one or more stored lighting settings. User directed changed lighting settings may be communicated to the lighting settings management engine 210 via network 201, optionally in combination with lighting contextual parameters and/or other data. The changed lighting settings and/or associated data may be stored in content database 215 by lighting setting management engine 210 to enable future retrieval of such changed lighting settings by other users. In some embodiments the lighting setting management engine 210 may perform one or more of the steps of methods described herein related generally to managing a database of lighting settings, such as methods described with reference to FIGS. 1, 3, and/or 4. The lighting setting management engine 210 may be implemented in hardware, firmware, and/or software running on hardware. For example, the lighting setting management engine 210 may be implemented in one or more computer servers.

A request for one or more stored lighting settings may be communicated to the lighting settings suggestion engine 212. The lighting settings suggestion engine 212 may retrieve one or more stored lighting settings from the content database 215 or elsewhere and supply such lighting settings to the requesting lighting controller 230A, 230B. In some embodiments the lighting suggestion engine 212 may calculate a relevancy ranking and/or a reconstructability ranking based on comparison of data supplied by the requesting lighting controller 230A, 230B and data associated with the stored lighting settings in the content database 215. The lighting suggestion engine 212 may sort provided lighting settings based on the relevancy ranking and/or the reconstructability ranking and/or may provide the relevancy ranking and/or the reconstructability ranking to enable sorting by the requesting lighting controller 230A, 230B. In some embodiments the requesting lighting controller 230A, 230B or other local processor may calculate the relevancy ranking and/or the reconstructability ranking based on data supplied from the lighting setting suggestion engine 212. In some embodiments the lighting setting suggestion engine 212 may perform one or more of the steps of methods described herein related generally to identifying relevant lighting settings for a lighting system, such as methods described with reference to FIGS. 1, 5, and 6. The lighting setting suggestion engine 212 may be implemented in hardware, firmware, and/or software running on hardware. For example, the lighting setting suggestion engine 212 may be implemented in one or more computer servers.

Many other configurations are possible having more or less components than the environment shown in FIG. 2. For example, although the lighting setting management engine 210, the content database 215, and the lighting setting suggestion engine 212 are illustrated in FIG. 2 as separate components, it is understood that in some environments the lighting setting management engine 210, the content database 215, and/or the lighting setting suggestion engine 212 may be combined as a single component. Also, for example, in some embodiments all or aspects of certain methods described as performed by lighting setting management engine 210 and/or the content database 215 in some embodiments may be performed by the lighting controllers 230A, 230B and/or one or more local processors in communication with the lighting controller 230A, 230B.

Figure 3:
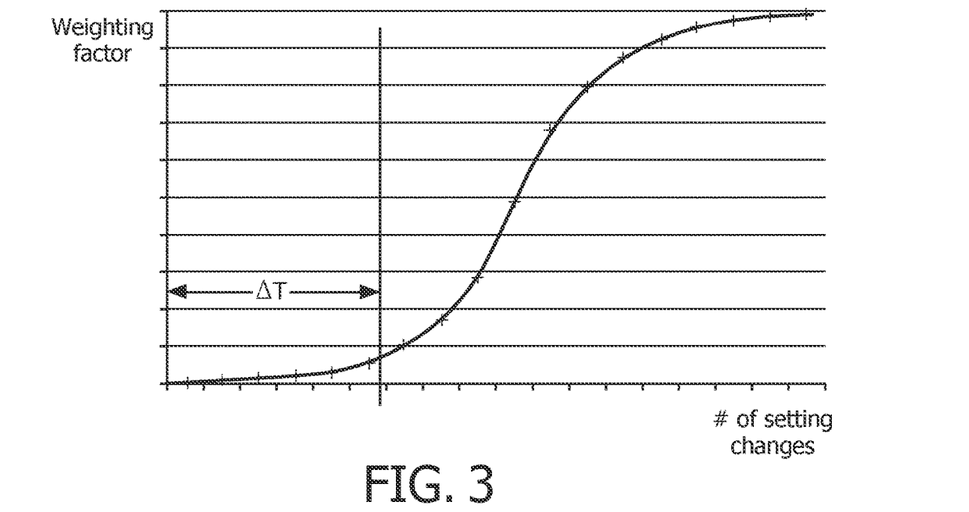
FIG. 3 illustrates an example of determining a weighting factor for a user's changed lighting settings.

FIG. 3 illustrates an example of determining a weighting factor for a user's changed lighting settings. The weighting factor may be associated with the stored changed lighting settings in a database. For example, the local processing engine 110 may determine the weighting factor of a user and associate the weighting factor in the local storage 115 with lighting settings supplied by the user. Also, for example, lighting setting management engine 210 may determine the weighting factor of a user and associate the weighting factor in the content database 215 with lighting settings supplied by the user. In some embodiments the weighting factor may be based on the experience level of the user implementing the changed lighting settings at the time the lighting settings are implemented. For example, as illustrated in FIG. 3, a weighting factor associated with the changed lighting settings implemented by a user may increase as the number of changed lighting settings the user has made increases. In some embodiments the number of changed lighting settings may be only changed lighting settings made by the user to a particular lighting system. In some embodiments the number of changed lighting settings may be any recordable changed lighting settings made by the user to any lighting system. The weighting factor in FIG. 3 may be determined by identifying the number of lighting setting changes made by the user and identifying the corresponding weighting factor corresponding to that number of lighting setting changes. For example, as illustrated in FIG. 3, the weighting factor at number of changes $\Delta\tau$ is equal to the value of the weighting curve at that point.

In some embodiments, the weighting factor may be based on the amount of time the user has had the lighting system for which the user is making changed lighting settings and increase the longer the user has had the lighting system. In some embodiments the weighting factor may be based on the amount of time the user has had any lighting system and increase the longer the user has had any lighting system. In some embodiments the weighting factor may be based on a stored profile of the user that provides an indication of the experience level of the user. For example, the stored profile may provide an indication of how long the user has been registered with the lighting recommendation and/or storage system. Also, for example, the stored profile may contain demographic information identifying the experience of the user such as, job, education, and/or training. For instance, a user employed as a lighting designer may receive a heightened weighting factor for changed lighting settings.

In some embodiments, the weighting factor may be utilized in determining a relevancy ranking for a stored lighting setting. For example, the local processing engine 110 and/or the lighting settings suggestion engine 212 may utilize the weighting factor associated with a lighting setting, optionally in combination with one or more additional factors, when calculating the relevancy ranking for the lighting setting (e.g., increasing the relevancy ranking as the weighting factor increases). In some embodiments a user may identify how much weight to give to the weighting factor in determining the relevancy ranking. In some embodiments the weighting factor may be utilized in sorting identified stored lighting settings. For example, the local processing engine 110 and/or the lighting settings suggestion engine 212 may sort identified stored lighting settings based on the weighting factor, optionally in combination with one or more additional factors. In some embodiments a user may identify how much weight to give to weighting factor in sorting identified stored lighting settings. In some embodiments the weighting factor may be utilized in filtering stored lighting settings. For example, the local processing engine 110 and/or the lighting processing engine 212 may filter out certain identified stored lighting settings prior to and/or after calculation of the relevancy ranking based on the weighting factor, optionally in combination with one or more additional factors. For example, in some embodiments the group of stored lighting settings for which relevancy rankings are determined may initially be filtered to only include certain stored lighting settings that have at least a threshold weighting factor. In some embodiments a user may identify a threshold weighting factor in filtering out stored lighting settings prior to or after calculation of the relevancy ranking.

Figure 4:
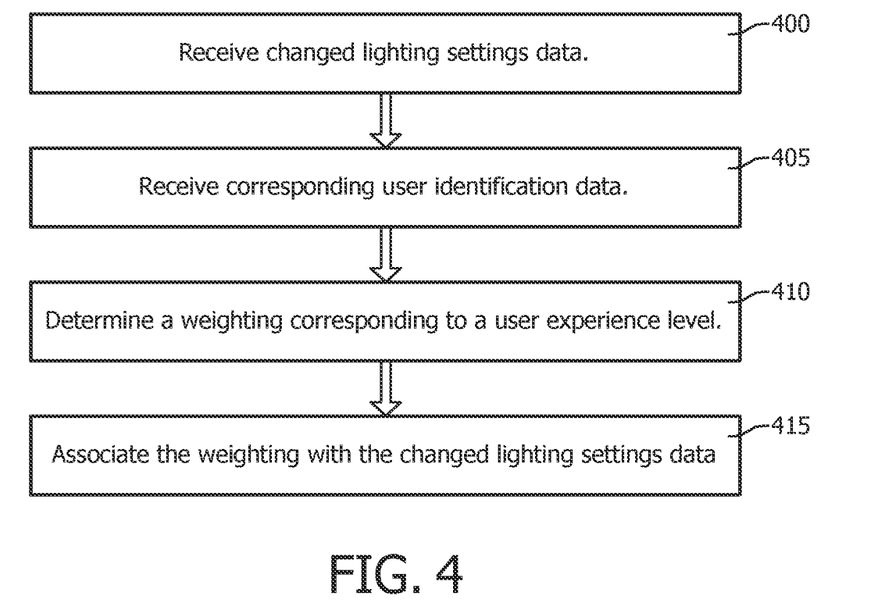
FIG. 4 illustrates a flow chart of an example method of managing a database of relevant lighting settings.

FIG. 4 illustrates a flow chart of an example method of managing a database of relevant lighting settings. Other embodiments may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the lighting controller 120, the local processing engine 110, the lighting controller 230A, the lighting controller 230B, and/or the lighting setting management engine 210.

At step 400 changed lighting settings data is received. For example, in some embodiments changed lighting settings data may be received from a lighting controller in response to a user initiated direct change to one or more settings thereof via a user interface. In some embodiments the changed lighting settings data may be received at the lighting controller 120, the local processing engine 110, the lighting controller 230A, the lighting controller 230B, and/or the lighting setting management engine 210.

At step 405 user identification data is received that corresponds with the changed lighting settings data. For example, in some embodiments user identification data may be received from a lighting controller in response to a user initiated direct change to one or more settings thereof via a user interface. The user identification data includes data that enables identification of the lighting system transmitting the changed lighting settings data. In some embodiments the user identification data may include user supplied login information, a MAC address, an IP address, and/or other identifier. In some embodiments the user identification data may be received at the lighting controller 120, the local processing engine 110, the lighting controller 230A, the lighting controller 230B, and/or the lighting setting management engine 210. In some embodiments the user identification data may optionally be anonymous to prevent the user identification data from being traceable to a particular individual and to protect the identity of the user.

At step 410 a weighting corresponding to a user experience level is determined. For example, in some embodiments transmitted user identification data may be utilized to retrieve corresponding weighting from a database. Also, for example, in some embodiments weighting data may be transmitted by a lighting controller that transmitted the changed lighting settings data. In some embodiments the weighting may be determined at the lighting controller 120, the local processing engine 110, the lighting controller 230A, the lighting controller 230B, and/or the lighting setting management engine 210.

At step 415 the weighting is associated with the changed lighting settings data. For example, in some embodiments the weighting and the changed lighting settings data are associated with one another in a database. In some embodiments the association may occur at local storage 115, content database 215, the lighting controller 120, the local processing engine 110, the lighting controller 230A, the lighting controller 230B, and/or the lighting setting management engine 210. The stored weighting may be utilized in identifying whether the associated lighting setting is appropriate for recommendation to a lighting user for implementation in a lighting system of the user.

Figure 5:
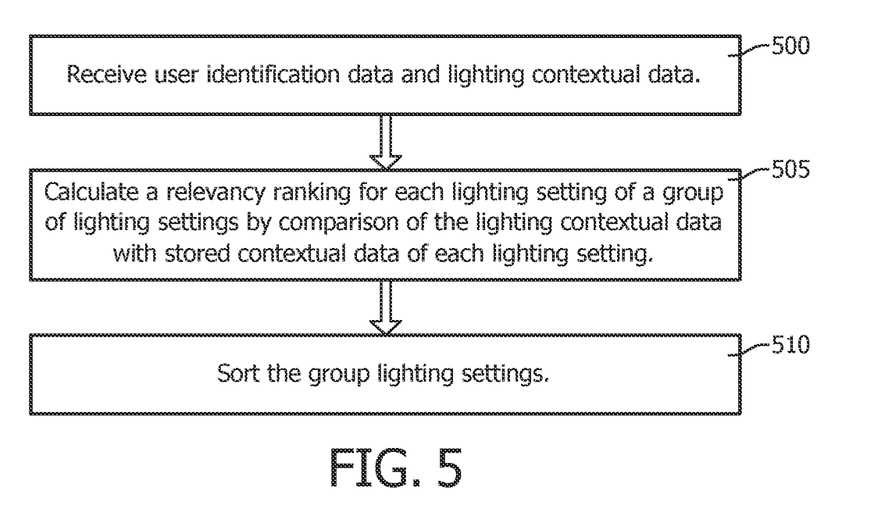
FIG. 5 illustrates a flow chart of an example method of identifying relevant lighting settings.

FIG. 5 illustrates a flow chart of an example method of identifying relevant lighting settings. Other embodiments may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the lighting controller 120, the local processing engine 110, the lighting controller 230A, the lighting controller 230B, and/or the lighting setting suggestion engine 212.

At step 500 user identification data and lighting contextual data is received. For example, in some embodiments such data may be received from a lighting controller in response to a user initiated request for recommended settings via a user interface. In some embodiments the user identification data and the lighting contextual data may be received at the lighting controller 120, the local processing engine 110, the lighting controller 230A, the lighting controller 230B, and/or the lighting setting suggestion engine 212. In some embodiments the user identification data may be anonymous.

At step 505 a relevancy ranking is calculated for each lighting setting of a group of lighting settings by comparison of the received lighting contextual data with stored contextual data of each lighting setting. For example, as discussed herein with respect to FIG. 1, in some embodiments the relevancy ranking may be calculated as a cosine similarity between the received contextual data and the stored contextual data of each lighting setting. In some embodiments a user experience level weighting factor associated with each lighting setting may be utilized in determining the relevancy ranking. In some embodiments a user experience level weighting factor may be utilized in identifying which lighting settings are provided in the group of lighting settings. In some embodiments the relevancy ranking may be calculated at the lighting controller 120, the local processing engine 110, the lighting controller 230A, the lighting controller 230B, and/or the lighting setting suggestion engine 212.

At step 510 the group of lighting settings is sorted. In some embodiments the group of lighting settings is sorted based on the relevancy ranking. In some embodiments the group of lighting settings is additionally or alternatively sorted based on a user experience level weighting factor. In some embodiments the group of lighting settings is additionally or alternatively sorted based on one or more other factors such as popularity of the lighting settings and/or geographic location associated with the lighting settings. In some embodiments the sorting may be performed at the lighting controller 120, the local processing engine 110, the lighting controller 230A, the lighting controller 230B, and/or the lighting setting suggestion engine 212.

Figure 6:
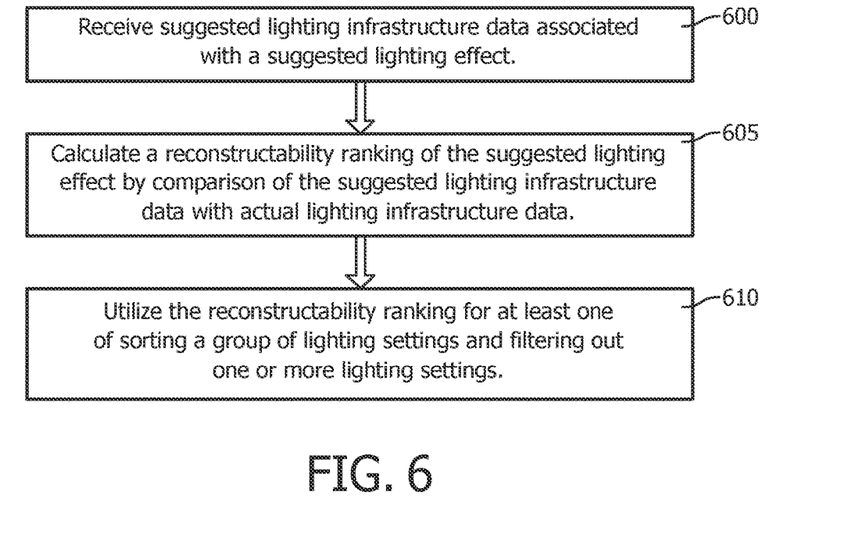
FIG. 6 illustrates a flow chart of an example method of calculating and utilizing a reconstructability ranking.

FIG. 6 illustrates a flow chart of an example method of calculating and utilizing a reconstructability ranking. Other embodiments may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the lighting controller 120, the local processing engine 110, the lighting controller 230A, the lighting controller 230B, and/or the lighting setting suggestion engine 212.

At step 600 suggested lighting infrastructure data associated with a suggested lighting effect is received. Lighting infrastructure data may include information pertaining to which lighting fixture types are utilized in a lighting system and/or the positioning of lighting fixtures within a lighting system to one another. In some embodiments the lighting infrastructure data may be acquired from a home automation controller or a scene-setting system. The suggested lighting infrastructure data may be received via the lighting controller 120, the local processing engine 110, the lighting controller 230A, the lighting controller 230B, and/or the lighting setting suggestion engine 212.

At step 605 a reconstructability ranking is calculated for the suggested lighting effect by comparison of the suggested lighting infrastructure data with actual lighting infrastructure data. The more similar a suggested lighting infrastructure is to the actual lighting infrastructure, the more likely the suggested lighting effect is relevant. The reconstructability ranking estimates how well the actual infrastructure can recreate the suggested lighting effect. The reconstructability ranking may be determined via a comparison between the parameters of suggested lighting infrastructure data associated with the suggested lighting effect and parameters space of actual lighting infrastructure data. For example, if a suggested lighting effect makes an extensive use of RGB lighting effect whereas the actual lighting infrastructure data indicates RGB cannot be rendered, it will be reflected in a low reconstructability ranking. Relative positioning of individual light sources may be another aspect of the reconstructability ranking. Some embodiments of calculating the reconstructability ranking may use a camera sensor to perform the dark room calibration and construct the palette of primaries at different nodes. The reconstructability ranking may be calculated utilizing the lighting controller 120, the local processing engine 110, the lighting controller 230A, the lighting controller 230B, and/or the lighting setting suggestion engine 212.

At step 610 the reconstructability ranking is utilized for at least one of sorting a group of lighting settings and filtering out one or more lighting settings. For example, the reconstructability ranking, optionally in combination with one or more additional factors, may be used in sorting identified lighting settings before presentation to a user.

Also, for example, the reconstructability ranking may be utilized to filter out stored lighting settings. For example, in some embodiments certain identified stored lighting settings may be filtered out prior to and/or after calculation of the relevancy ranking based on the reconstructability ranking, optionally in combination with one or more additional factors. For example, in some embodiments the group of stored lighting settings for which relevancy rankings are determined may initially be filtered to only include certain stored lighting settings that have at least a threshold reconstructability ranking. In some embodiments a user may identify a threshold reconstructability ranking in filtering out stored lighting settings prior to or after calculation of the relevancy ranking.

In some embodiments, one or more additional lighting fixtures may be recommended to a user. For example, it may be determined that a user strongly likes particular lighting settings that are created by other users that are similar to the user (e.g., as determined by geographic location, setting, and/or age) and/or other users that have similar lighting infrastructures as the user. It may further be determined that those other users have lighting fixtures that the user does not have but that are frequently used in the lighting settings the user likes most. Based on one or more of these and/or other determinations the additional lighting fixtures may be recommended to the user to enable the user to expand the possibility of implementable lighting settings in accordance with the user's preferences. Also, for example, lighting characteristics and/or lighting contextual data may be analyzed to recommend additional lighting fixtures that may expand the possibility of implementable lighting settings in accordance with the user's preferences. In some embodiments the additional lighting fixtures may be recommended by the lighting setting suggestion engine 212.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Also, the reference numerals appearing in the claims, if any, are provided merely for convenience and should not be interpreted as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of identifying and utilizing relevant lighting settings for a lighting system, comprising:
  receiving identification data and lighting system contextual data, said identification data indicative of a user of a lighting system and said lighting system contextual data indicative of at least one contextual parameter of said lighting system, said contextual parameter providing context regarding at least one of a lighting fixture of the lighting system, a lighting controller of the lighting system, and an environment of the lighting system;
  calculating a relevancy ranking for each lighting setting of a group of lighting settings by comparing at least some of said lighting system contextual data to stored contextual data associated with each said lighting setting; and
  sorting said group of lighting settings based on said relevancy ranking of said lighting settings;
  wherein at least one of the steps of sorting said group of lighting settings, and calculating the relevancy ranking for each said lighting setting of said group of lighting settings, is based on one or more setting creator experience levels of said lighting settings identifying said group of lighting settings from a larger set of lighting settings,
  wherein each of said setting creator experience levels indicates a lighting related experience level of a user that created a corresponding of said lighting settings; and
  implementing at least one lighting setting in said group of lighting settings in light output of said lighting system based on at least one of said calculating or sorting.

2. The method of claim 1, further comprising calculating a reconstructability ranking for each said lighting setting of said group of lighting settings wherein said reconstructability ranking of a given lighting setting of said group of lighting settings estimates how well said lighting system can recreate said given lighting setting.

3. The method of claim 2, wherein said step of calculating said reconstructability ranking includes comparing lighting system architectural data of said lighting system with architectural data associated with each of said lighting settings.

4. The method of claim 2, wherein said step of sorting said group of lighting settings is also based on said reconstructability ranking.

5. The method of claim 2, wherein identification of said group of lighting settings is also based on said reconstructability ranking.

6. The method of claim 2, further comprising providing said reconstructability ranking to said user.

7. The method of claim 1, wherein compared of said contextual data includes lighting infrastructure data indicative of an infrastructure of said lighting system.

8. The method of claim 1, wherein compared of said contextual data includes geographical location information.

9. The method of claim 1, wherein said step of sorting said group of lighting settings is based on said setting creator experience level.

10. A method of automatically receiving actual lighting settings from a first user and providing the actual lighting settings as recommended lighting settings to a second user for implementation, comprising:

automatically receiving first lighting settings and corresponding first lighting contextual data, said first lighting settings indicative of lighting characteristics of a first lighting system of a first user of said first lighting system, said first lighting contextual data indicative of at least one first contextual parameter of said first lighting system, said contextual parameter providing context regarding at least one of a lighting fixture of the lighting system, a lighting controller of the lighting system, and an environment of the lighting system;

determining an experience level of said first user, said experience level of said first user indicative of a level of lighting related experience of said first user;

associating said experience level with said lighting settings;

receiving second lighting contextual data from a second user of a second lighting system, said second lighting contextual data indicative of at least one second contextual parameter of said second lighting system;

receiving a suggested lighting settings request from said second user;

calculating ranking of said first lighting settings for said suggested lighting settings request based on comparing said second contextual parameter to said first contextual parameter and based on said experience level of said first user; and implementing at least one lighting setting of said first lighting settings in light output of said second lighting system based on said calculating.

* * * * *